United States Patent
Brambilla et al.

(10) Patent No.: US 10,641,909 B2
(45) Date of Patent: May 5, 2020

(54) METHOD FOR PROCESSING A PULSE GENERATED BY A DETECTOR OF IONIZING RADIATION

(71) Applicant: Commissariat a l'energie atomique et aux energies alternatives, Paris (FR)

(72) Inventors: Andrea Brambilla, Veurey-Voroize (FR); Cinzia De Cesare, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 88 days.

(21) Appl. No.: 16/037,456

(22) Filed: Jul. 17, 2018

(65) Prior Publication Data

US 2019/0033469 A1    Jan. 31, 2019

(30) Foreign Application Priority Data

Jul. 17, 2017   (FR) ...................... 17 56775

(51) Int. Cl.
*G01T 1/17* (2006.01)
*G01T 1/24* (2006.01)

(52) U.S. Cl.
CPC ................ *G01T 1/17* (2013.01); *G01T 1/247* (2013.01)

(58) Field of Classification Search
CPC .................................. G01T 1/17; G01T 1/247
(Continued)

(56) References Cited

U.S. PATENT DOCUMENTS

2007/0298732 A1* 12/2007 Lee ...................... H04L 27/362
455/102
2010/0027747 A1    2/2010 Mott
(Continued)

FOREIGN PATENT DOCUMENTS

CA    2 732 522 A1    2/2010
FR    3069066 B1 *    8/2019 ............... G01T 1/17

OTHER PUBLICATIONS

French Preliminary Search Report dated May 4, 2018 in French Application 17 56775 filed on Jul. 17, 2017 (with English Translation of Categories of Cited Documents and Written Opinion).

(Continued)

*Primary Examiner* — David P Porta
*Assistant Examiner* — Gisselle M Gutierrez
(74) *Attorney, Agent, or Firm* — Oblon, McClelland, Maier & Neustadt, L.L.P.

(57) ABSTRACT

The invention is a method for processing a pulse generated by a detector of ionizing radiation, the detector being configured to interact with ionizing radiation in order to generate said pulse, the amplitude of which depends on an energy liberated by the ionizing radiation during its interaction in the detector, the method including the following steps:

a) exposing the detector to a source of ionizing radiation so as to obtain, at a measurement time, a pulse called the measurement pulse;

b) shaping the measurement pulse, using a first shaping time, and determining a first amplitude of the measurement pulse thus shaped; and c) correcting the first amplitude measured in step b), by taking into account a correction factor;

the correction factor being determined by taking into account pulses, called pulses of interest, formed by the detector during an exposure to the source or to a calibration source, during a time range of interest.

17 Claims, 11 Drawing Sheets

(58) Field of Classification Search
USPC .......................................................... 250/395
See application file for complete search history.

(56) References Cited

U.S. PATENT DOCUMENTS

| | | | | |
|---|---|---|---|---|
| 2011/0098980 | A1* | 4/2011 | Ouvrier-Buffet | G01T 1/171 |
| | | | | 702/189 |
| 2012/0099397 | A1* | 4/2012 | Inoue | G01S 7/527 |
| | | | | 367/87 |
| 2013/0046500 | A1* | 2/2013 | Rinkel | G01T 1/171 |
| | | | | 702/104 |
| 2013/0168562 | A1* | 7/2013 | Brambilla | G01T 1/241 |
| | | | | 250/370.01 |
| 2017/0086761 | A1 | 3/2017 | Fu et al. | |
| 2019/0204459 | A1* | 7/2019 | Shahar | G01T 1/241 |

OTHER PUBLICATIONS

L. Abbene, et al., "High-rate x-ray spectroscopy in mammography with a CdTe detector: A digital pulse processing approach," Medical Physics, vol. 37, No. 12, 2010, pp. 6147-6156.

* cited by examiner

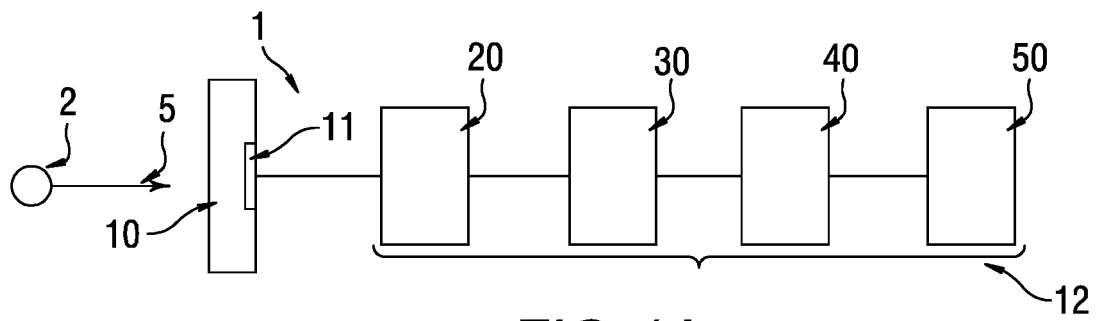
FIG. 1A
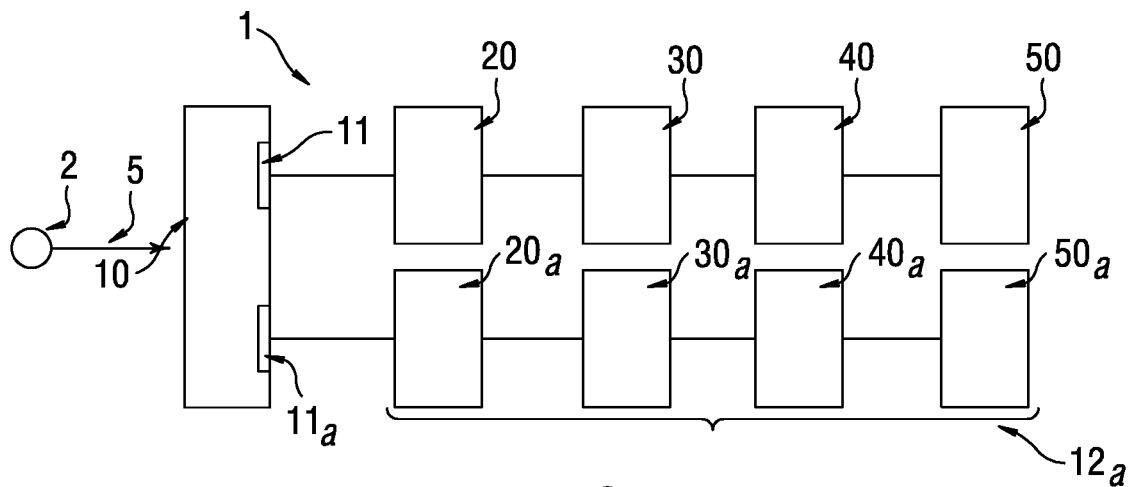
FIG. 1B
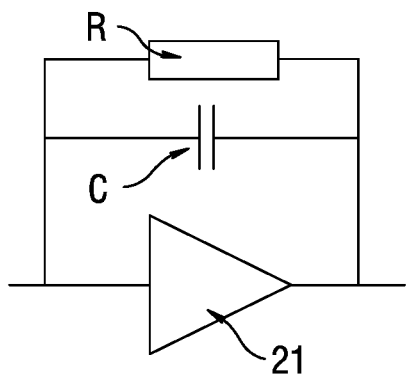 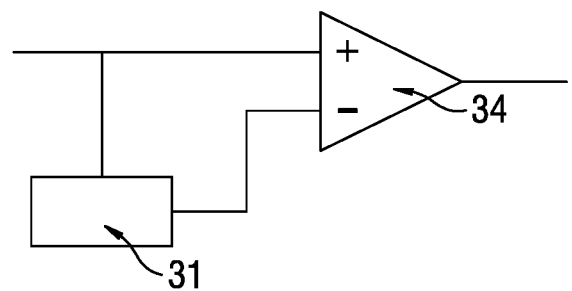
FIG. 1C          FIG. 1D

METHOD FOR PROCESSING A PULSE GENERATED BY A DETECTOR OF IONIZING RADIATION

TECHNICAL FIELD

The invention relates to detectors of ionizing radiation, in particular photonic x-rays or gamma rays.

PRIOR ART

Devices for detecting ionizing radiation, based on gaseous, semiconductor or scintillator detector materials, allow electrical pulses formed by interactions between the radiation and the detector material to be obtained. The amplitude of each pulse depends on the energy deposited by the radiation during each interaction. These devices are frequently used in applications requiring the energy of the ionizing radiation incident on the detector to be known. The fields of application are many, and in particular comprise non-destructive inspection, for example the inspection of luggage, medical diagnostics or measurements in nuclear plants. Generally, these devices include a pulse-processing electronic circuit that allows the amplitudes of the pulses to be estimated as precisely as possible. In particular, so as to make it possible to estimate the amplitude of each pulse with precision, a circuit for shaping the pulses generated by the detector is used. Specifically, this precision depends on the precision with which the energy of the radiation is estimated, this being dependent on the energy resolution of the detector. Shaping circuits are generally parameterized by a time constant, or shaping time, with which each pulse is analysed. It is generally accepted that the optimal time constant is higher than or equal to the rise time of the electrical pulses formed by the detector.

Certain applications require what are called high-count-rate measurements to be carried out, when the detector is exposed to intense incident radiation. In such configurations, two interactions, with different particles, may occur at the same time, or in a time interval that is so short that the electrical pulse formed is no longer representative of an interaction with one particle, but rather of a superposition of pulses formed consecutively by various particles. This corresponds to a pile-up. The amplitude of a pulse resulting from a pile-up is high, because it corresponds to the sum of all or some of the various amounts of energy deposited in the detector by a plurality of particles. Thus, a pulse resulting from a pile-up cannot be used to determine the energy of one incident particle.

In order to limit the occurrence of pile-ups, it is accepted that it is necessary to decrease the shaping time with which the shaping circuit processes each pulse, to the detriment of energy resolution, as mentioned in the publication Goulding F. S. "Large coaxial germanium detectors—Correction for ballistic deficit and trapping losses", IEEE transactions on nuclear science, Vol. 37, No. 2, April 1990. In the aforementioned publication, the authors use two different shaping circuits, processing each pulse with a first shaping time and with a second shaping time, respectively, the second shaping time being longer than the first shaping time. The detector used is a large-volume germanium coaxial detector, this type of detector being particularly suitable for high-energy-resolution measurements at low flux. This method includes an estimation of the ballistic deficit of each pulse processed with the second shaping time, i.e. the longer shaping time. The estimation of the ballistic deficit is estimated by combining a subtraction of the respective amplitudes of the pulses obtained from the two shaping circuits, with a ratio between the two shaping times. The ballistic deficit thus estimated is added to the pulse processed by the second shaping circuit, the main objective being to optimize energy resolution.

The inventors of the present invention consider the method described above to be difficult to apply to situations in which a small-volume detector exposed to high count rates is used. They provide a method for processing a pulse generated by a detector, that is compatible with high count rates and that still allows a reliable and robust estimation of the energy corresponding to each interaction to be obtained.

SUMMARY OF THE INVENTION

A first subject of the invention is a method for processing a pulse generated by a detector of ionizing radiation, the detector being configured to interact with ionizing radiation in order to the pulse, the amplitude of the pulse depending on an energy generated by the ionizing radiation during its interaction in the detector, the method including:
 a) exposing the detector to a source of ionizing radiation so as to obtain, at a measurement time, a measurement pulse;
 b) shaping the measurement pulse, using a first shaping time, and determining a first amplitude of the measurement pulse thus shaped; and
 c) correcting the first amplitude determined in b), by taking into account a correction factor, so as to obtain a corrected amplitude;
the correction factor being determined by taking into account pulses of interest, formed by the detector during an exposure to the source or to a calibration source, during a time range of interest, the determination of the correction factor including, for each pulse of interest:
 i) shaping the pulse of interest, in a first shaping operation, using the first shaping time, and measuring a first amplitude of the pulse of interest thus shaped;
 ii) shaping the pulse of interest, in a second shaping operation, using a second shaping time that is different from the first shaping time, and measuring a second amplitude of the pulse of interest thus shaped; and
 iii) comparing the first amplitude and the second amplitude of the pulse of interest, so as to calculate a comparison factor;
the correction factor being determined depending on the comparison factors calculated, in step iii), for each pulse of interest.

Thus a measurement pulse is obtained the first amplitude of which is corrected.

The second shaping time may be longer or shorter than the first shaping time.

According to an embodiment, the method also includes:
 shaping the measurement pulse in a second shaping operation, using the second shaping time, and determining a second amplitude of the measurement pulse thus shaped; and
 comparing the first amplitude and the second amplitude of the measurement pulse, so as to calculate, for the measurement pulse, a comparison factor;
such that the correction factor is also determined depending on the comparison factor calculated for the measurement pulse.

In step iii), the correction factor may be determined depending on a mean value or a median value of the comparison factors respectively calculated for each pulse of interest, optionally taking into account the correction factor calculated for the measurement pulse.

The time range of interest may lie before and/or after the measurement time. It may comprise the measurement time or not comprise the measurement time.

The time range of interest corresponds to a calibration phase, in which the detector is exposed to a calibration source, the method being such that, after step iii), the determination of the correction factor also includes, for each pulse of interest, the following steps:
- iv) shaping the pulse of interest, in a third shaping operation, using a third shaping time, the third shaping time being strictly longer than the second shaping time and than the first shaping time, and determining a third amplitude of the pulse of interest thus shaped; and
- v) comparing the third amplitude with the first amplitude of the pulse of interest resulting from i) or with the second amplitude of the pulse of interest, resulting from ii), so as to calculate what is called an auxiliary comparison factor;

the determination of the correction factor also including establishing a correction function representing the variation of the comparison factor determined for the pulses of interest as a function of the auxiliary comparison factor determined for said pulses of interest, the method also including:
- shaping the measurement pulse, in a second shaping operation, using the second shaping time, and determining a second amplitude of the measurement pulse; and
- comparing the first amplitude and the second amplitude of the measurement pulse, so as to calculate, for the measurement pulse, a comparison factor;

such that, in step c), the correction factor is determined depending on a value of the correction function corresponding to the comparison factor calculated for the measurement pulse.

According to one embodiment:
- a) and b) are implemented for a plurality of measurement pulses, during an acquisition period, the method including a step b') of forming a spectrum, representing a histogram of the first amplitudes shaped in each step b);
- i) to iii) are carried out for each pulse acquired during the acquisition period, such that the time range of interest corresponds to the acquisition period; and
- in c), the method includes a realignment of the spectrum formed in step b'), taking into account the correction factor calculated in step iii), so as to form a corrected spectrum.

Preferably, in each embodiment, the determination of the correction factor includes a selecting step for selecting pulses of interest, the selecting step including, for each pulse of interest:
- determining a criterion of the pulse of interest or of the pulse resulting from the first or from the second operation of shaping the pulse of interest;
- comparing the criterion with a threshold value; and
- selecting the pulse of interest depending on the comparison;

such that steps i) to iii) are implemented only for the pulses of interest thus selected.

The selecting step may include:
- determining a duration of the pulse of interest resulting from the first or from the second shaping operation;
- comparing the determined duration with a threshold duration; and
- selecting the pulse of interest depending on the comparison.

The threshold duration may be a pre-set duration.

The selecting step may include:
- determining an area and an amplitude of the pulse resulting from the first or from the second operation of shaping the pulse of interest;
- calculating a ratio between the area and amplitude thus determined;
- comparing the ratio with a threshold ratio value; and
- selecting the pulse of interest depending on the comparison.

The selecting step may include: determining the second time derivative of the pulse of interest or of the pulse resulting from the first or from the second operation of shaping the pulse of interest, the pulse of interest being selected if the second time derivative does not tend to zero or does not change sign.

The selecting step may include:
- determining a rise time of the pulse of interest or of the pulse resulting from the first or from the second operation of shaping the pulse of interest;
- comparing the determined rise time with a threshold value of the rise time; and
- selecting the pulse of interest depending on the comparison.

According to one embodiment, the detector may include:
- a collecting electrode, allowing the measurement pulse and the pulses of interest to be formed; and
- an electrode adjacent to the collecting electrode, the adjacent electrode being able to form a pulse, called the adjacent pulse, the amplitude of which depends on an energy liberated by the ionizing radiation during its interaction in the detector.

The determination of the correction factor may include a step of selecting pulses of interest, the selecting step including, for each pulse of interest:
- assigning a detection time to the pulse of interest;
- analysing pulses formed by the adjacent electrode in a time range of coincidence lying about the detection time; and
- rejecting the pulse of interest when a pulse, resulting from the adjacent electrode, in the time range of coincidence, exceeds an amplitude threshold.

According to one embodiment:
- in step b), the measurement pulse is shaped by applying a first time delay to the measurement pulse, to form a delayed measurement pulse, and by subtracting the delayed measurement pulse from the measurement pulse, the time delay corresponding to the first shaping time;
- in step i), the first operation of shaping the pulse of interest is carried out by applying the first time delay to the pulse of interest, in order to form a first delayed pulse of interest, and by subtracting the first delayed pulse of interest from the pulse of interest; and
- in step ii), the second operation of shaping the pulse of interest is carried out by applying a second time delay to the pulse of interest, to form a second delayed pulse of interest, and by subtracting the second delayed pulse of interest from the pulse of interest, the second time delay corresponding to the second shaping time.

According to one embodiment:
- in step b), the measurement pulse is shaped by applying a first filter to the measurement pulse, the first filter taking into account the first shaping time;

in step i), the first operation of shaping the pulse of interest is carried out by applying the first filter to the measurement pulse; and in step ii), the second operation of shaping the pulse of interest is carried out by applying the second filter to the pulse of interest, the second filter taking into account the second shaping time.

Another object of the invention is an electronic circuit for processing a pulse formed by a detector of an ionizing radiation, the detector including:

a detector material, intended to interact with the ionizing radiation, so as to form electrical charge during an interaction of the ionizing radiation in the detector; and a preamplifying circuit, configured to collect the charge generated by the detector and to form a pulse, called the measurement pulse, the amplitude of which depends on the amount of charge collected;

the electronic processing circuit being characterized in that it includes:

a first shaping circuit, configured to shape the measurement pulse using a first shaping time, so as to generate a first shaped pulse;

a second shaping circuit, configured to shape the measurement pulse using a second shaping time duration, longer than the first shaping time, so as to generate a second shaped pulse;

a comparing unit, able to compare the first shaped pulse and the second shaped pulse, so as to determine a comparison factor;

a computing unit, configured to determine a correction factor depending on the comparison factor; and a correcting unit, able to apply the correction factor determined by the computing unit to the first shaped pulse, so as to form a corrected pulse.

According to one embodiment:

the first shaping circuit includes a first delay line, which delay line is configured to apply a first delay, corresponding to the first shaping time, to the measurement pulse, the first shaping circuit including a subtractor that is configured to subtract the pulse thus delayed from the measurement pulse; and the second shaping circuit includes a second delay line, which delay line is configured to apply a second delay, corresponding to the second shaping time, to the measurement pulse, the second shaping circuit including a subtractor that is configured to subtract the pulse thus delayed from the measurement pulse.

According to one embodiment:

the first shaping circuit is a filter able to generate, from the measurement pulse, a first pulse of pre-set shape parameterized by the first shaping time; and the second shaping circuit is a filter able to generate, from the measurement pulse, a second pulse of pre-set shape parameterized by the second shaping time.

The computing unit is able to implement steps i) to iii) of the method according to the first object of the invention, on the basis of pulses of interest formed by the detector during a time range of interest.

Other advantages and features will become more clearly apparent from the following description of particular embodiments of the invention, which are given by way of nonlimiting example, and shown in the figures listed below.

FIGURES

FIGS. 1A and 1B show an example of a detecting device.
FIG. 1C shows one model of a preamplifier.
FIG. 1D shows a model of a delay-line shaping circuit.
FIGS. 2A and 2B illustrate the operation of a delay-line circuit. FIG. 2A shows an example of a measurement pulse, output from a preamplifier, of the measurement pulse delayed by a first time interval and of a pulse, called the shaped pulse, obtained by subtracting the delayed measurement pulse from the measurement pulse. FIG. 2B shows an example of a measurement pulse, output from a preamplifier, of the measurement pulse delayed by a second time interval and of a pulse, called the shaped pulse, obtained by subtracting the delayed measurement pulse from the measurement pulse.

DESCRIPTION OF PARTICULAR EMBODIMENTS

Figure 2A:
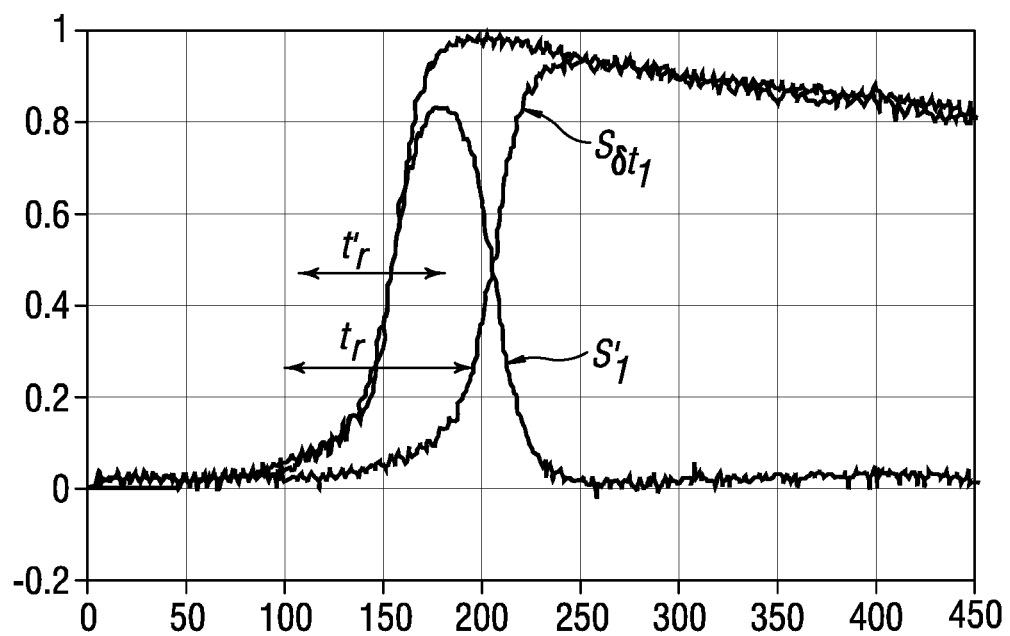
FIG. 2C illustrates shaping of a measurement pulse with a trapezoidal filter. It shows a measurement pulse and two pulses shaped using a first shaping time and a second shaping time, respectively.

FIG. 1A shows a device 1 allowing the invention to be implemented. The device includes a detector 10, able to interact with ionizing radiation 5 emitted by a source 2 of irradiation. By ionizing radiation, what is meant is radiation formed from particles able to ionize matter. It may be alpha particles, beta particles, x-rays or gamma rays, or even of one or more neutrons. In the example shown, the radiation 5 is x-ray or gamma-ray formed from photons the energy of which is, for example, comprised between 1 keV and 2 MeV.

In the example shown, the detector includes the semiconductor CdTe, but another semiconductor commonly implemented in the detection of ionizing radiation, Ge, Si, or CdZnTe for example, could be used instead. When a particle, in the present case a photon, of the ionizing radiation 5 interacts in the detector 10, charge carriers form and migrate to a collecting electrode 11, an anode for example. The amount of charge Q collected by the electrode 11 depends, preferably linearly, on the energy E liberated by the particle under the effect of the interaction.

Other types of detectors, for example scintillators coupled to a photon/charge-carrier converter, or an ionization chamber, i.e. a gas-based detector, are usable provided that they allow an amount of charge Q to be collected under the effect of an energy E generated by the ionizing radiation during an interaction in the detector 10. In this description, the term amplitude is the maximum height of a pulse. It may also be the integral of a pulse, or of any other function of the maximum height or of the integral of the pulse.

The collecting electrode 11 is connected to an electronic processing circuit 12, including:

- a preamplifying circuit 20, for example a charge preamplifier, configured to integrate the charge collected by the collecting electrode 11 and to form a pulse S the amplitude A of which depends on the amount of charge Q collected by the electrode 11 following interaction of a particle in the detector 10. Such a preamplifier is schematically shown in FIG. 1C.
- an amplifier 30, configured to amplify and shape the pulse S and to form a shorter pulse S', so that the formation of pile-ups is less likely. The pulse S' has an amplitude A'. An example of an amplifier is described below with reference to FIG. 1D.
- a correcting circuit 40, for correcting the shaped pulse generated by the shaping circuit 30 and forming a corrected pulse $S_C$ the amplitude $A'_C$ of which, which is called the corrected amplitude, is such that $$A'_c = \frac{1}{\eta} \times A',$$

where η is a correction factor. An important aspect of the invention is the determination of the correction factor η, the latter being variable over time. This determination is described below.

- an analyser 50 for analysing the corrected amplitude $A'_C$, and more precisely for classifying it depending on its value. It may be a question of a single-channel or multi-channel analyser, a multi-channel analyser allowing a spectrum Sp to be formed following the detection of a plurality of interactions. By energy spectrum, what is meant is the amplitude distribution of pulses during the exposure of the detector to a radiation source. Such a spectrum takes the form of a histogram, each term Sp(i) of which represents the number of detected pulses the amplitude of which is equal to i. By amplitude equal to i what is meant is an amplitude comprised in an amplitude range Δi comprising the value i, and for example centred on the value i. The relationship between the amplitude of a pulse and the energy deposited during the interaction that caused the pulse, is generally linear, and defined by a gain, called the conversion gain. Such a gain is defined during an energy calibration, in which the detector is subjected to radiation the energy of which is known. Preferably, this gain must be as stable as possible over time.

The electronic processing circuit 12 may include an analogue-digital converter (not shown in FIG. 1A), said converter possibly being placed between the preamplifier 20 and the shaping circuit 30, or between the shaping circuit 30 and the correcting circuit 40, or between the correcting circuit 40 and the analyser 50, or downstream of the latter. Depending on the position of the analogue-digital converter, the electronic circuits described above are either analogue circuits or digital circuits.

FIG. 1B shows a pixelated detector 10 including at least two collecting electrodes 11 and $11_a$, each collecting electrode being connected to a processing circuit 12, $12_a$, respectively. The collecting electrode $11_a$ is designated by the term adjacent electrode, because it is placed adjacent to the collecting electrode 11. The processing circuit 12 is such as that shown in FIG. 1A. The processing circuit $12_a$ comprises a preamplifier $20_a$, an amplifier $30_a$, a correcting circuit $40_a$, and an analyser $50_a$ such as those described with reference to the processing circuit 12. Usually, a pixelated detector may include several tens or even several hundred collecting electrodes. These electrodes may be arranged in a row or a two-dimensional matrix array.

Figure 2B:
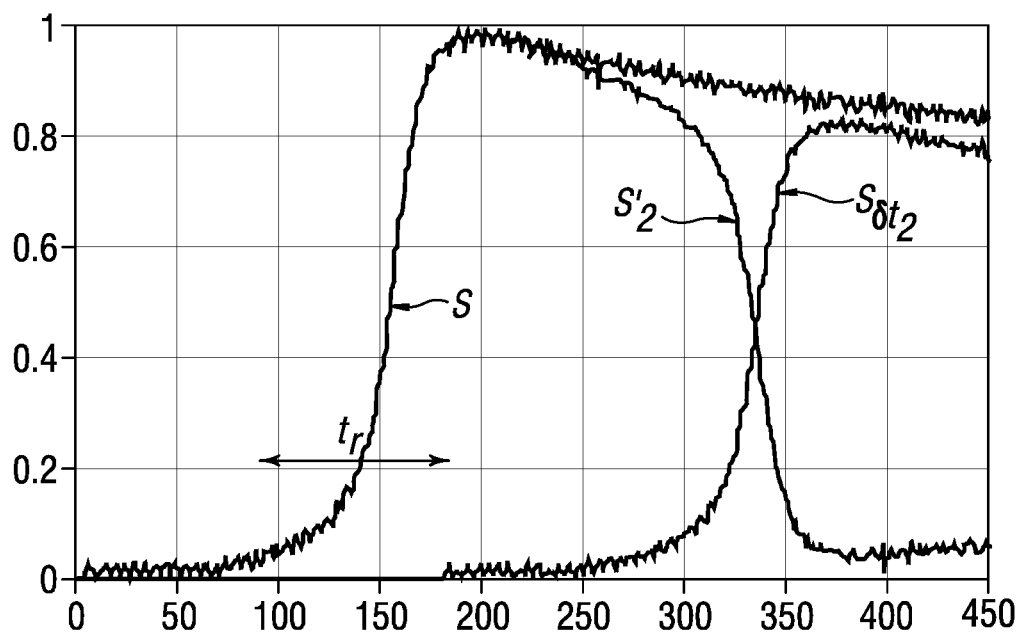

FIG. 1C schematically shows the preamplifying circuit 20 described above. It may be drawn as an amplifier 21 connected to an RC feedback loop, modelled by a resistor R in parallel with a capacitor C. The charge collected by a collecting electrode, during an interaction, forms a pulse, called the measurement pulse, the rise time $t_r$ of which is fast and the fall of which is slow, the fall possibly being modelled using an expression of the $$e^{-\frac{t}{RC}}$$

type, where t represents time. The rise time $t_r$ corresponds to the time interval between the start of the measurement pulse S and its maximum. Such a curve is shown in FIGS. 2A and 2B.

FIG. 1D schematically shows the amplifier 30, the latter including a delay line 31 that applies a delay δt to the pulse, so as to form a delayed pulse $S_{\delta t}$. A subtractor 32 allows a shaped pulse S' to be formed such that $S'=S-S_{\delta t}$. The principle of such a delay line is known, and is more precisely described in U.S. Pat. No. 7,652,242. The shaped pulse S' is more symmetrical than the pulse S output by the preamplifier. Its amplitude A' depends, preferably via a linear relationship, on the energy deposited by the ionizing radiation during its interaction in the detector 10. FIGS. 2A and 2B show two situations, corresponding to a first delay line applying a first delay $\delta t_1$ and to a second delay line applying a second delay $\delta t_2$ to the measurement pulse S, where $\delta t_1 > \delta t_2$. In this example, $\delta t_2 > t_r > \delta t_1$. The first delay line implements what is called a short shaping operation, whereas the second delay line implements a long shaping operation. These figures show a pulse S output from a preamplifier, the delayed pulses $S_{\delta t_1}$ and $S_{\delta t_2}$ and the pulses $S'_1$ and $S'_2$ output from the shaping circuit implementing the first delay $\delta t_1$ and the second delay $\delta t_2$, respectively, such that: $S'_1=S-S_{\delta t1}$ and $S'_2=S-S_{\delta t2}$.

The rise time $t'_r$ of a shaped pulse, corresponding to the time interval between the start of the shaped pulse and its maximum, usually designated by the term "peaking time", is frequently longer than or equal to the rise time $t_r$ of the measurement pulse S. In this case, the amplitude of the shaped pulse takes into account the entirety of the charge Q collected by the electrode. In the contrary case, as may be seen in FIG. 2A, when the rise time $t'_r$ of the shaped pulse S' is shorter than the rise time $t_r$ of the measurement pulse S, a fraction of the charge Q is not taken into account in the amplitude of the shaped pulse, this fraction not taken into account being designated by the term ballistic deficit. The peaking time $t'_r$ depends on the shaping time $\delta t$ taken into account by the circuit 30 for shaping the measurement pulse.

As mentioned with reference to the prior art, when the intensity of the incident ionizing radiation 5 is high, the flux of particles reaching the detector is high and the number of pulses S formed per unit time, designated by the term count rate, increases. This results in the appearance of pile-ups, a pile-up corresponding to a configuration in which two interactions, with two different particles, are sufficiently close together in time to form a single pulse, the amplitude of which pulse corresponds to the sum of the charge collected after each interaction. Thus, the pulse carries no relevant information as to the energy of the incident radiation. Such an effect may for example be observed in applications such as luggage inspection, in which luggage is exposed to intense beams of radiation so as to minimize inspection time. It may also be observed when nuclear measurements are carried out under high radiation, for example on nuclear components of high activity.

In high-count-rate applications, too high a peaking time $t'_r$ increases the probability of detection of pile-ups. It is necessary to decrease it, and to accept a certain ballistic deficit. However, it has been demonstrated that because fluctuations appear in the polarization of the detector material, when the peaking time $t'_r$ is shorter than the rise time $t_r$ of the measurement pulse delivered by the preamplifier 20, the amplitude of the shaped pulse S' varies over time. This variation is schematically shown in FIG. 3A, which shows pulses $S'_1$ shaped using a first delay $\delta t_1$ shorter than the rise time of the measurement pulse S output from the preamplifier.

Figure 3A:
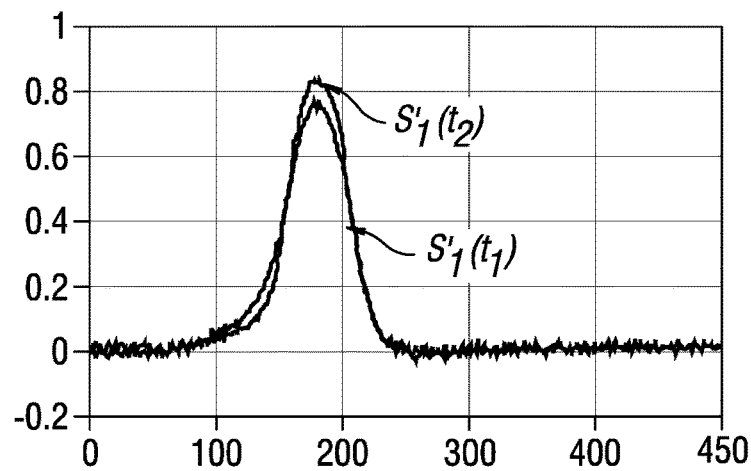
FIG. 3A shows two pulses shaped using a first shaping time, these pulses being obtained at a first time and at a second time, the first and second times being spaced apart by two hours.

FIG. 3A shows a first pulse $S'_1(t_1)$ and a second pulse $S'_1(t_2)$ formed from a measurement pulse $S(t_1)$ at a first time $t_1$ and from a measurement pulse $S(t_2)$ at a second time $t_2$, respectively. The two pulses $S'_1(t_1)$ and $S'_1(t_2)$ result from a delay-line shaping circuit applying a delay $\delta t_1$ of 50 ns. The measurement pulses $S(t_1)$ and $S(t_2)$ processed by the shaping circuit have a rise time $t_r$ of 100 ns. They result from the irradiation of a CdTe detector of 3 mm thickness to an isotopic $^{57}$Co source. The first shaped pulse $S'_1(t_1)$ was obtained at a time $t_1$ close to the turn-on of the detector. The second pulse was obtained at a time $t_2$ 120 minutes after the time $t_1$. The pulses $S'_1(t_1)$ and $S'_1(t_2)$ correspond to the emission peak of $^{57}$Co at the energy 122 keV. It may be observed that their respective amplitudes $A'_1(t_1)$ and $A'_1(t_2)$ are not identical, whereas they correspond to the same energy. Thus, in such a configuration, based on a short shaping time $\delta t_1$ shorter than the rise time $t_r$ of the measurement pulse S, the conversion gain, corresponding to a ratio between the amplitude $A'_1$ of the shaped pulse $S'_1$ and the energy of the interaction having generated the measurement pulse S, is not stable over time.

Figure 3B:
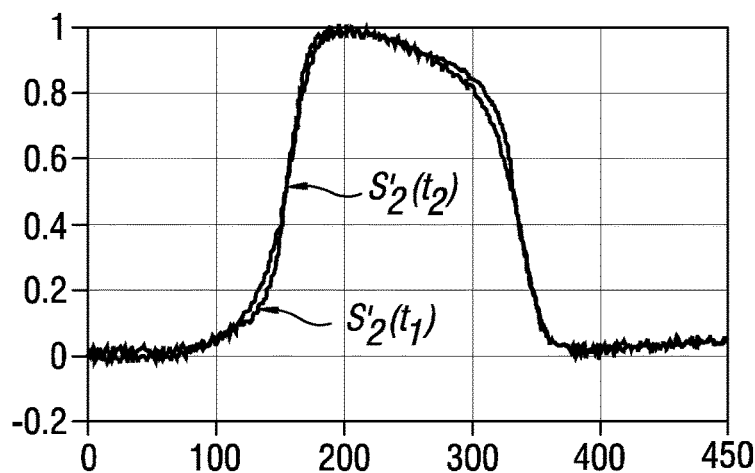
FIG. 3B is similar to FIG. 3A, the pulses being shaped using a second shaping time longer than the first shaping time.

FIG. 3B shows two pulses $S'_2(t_1)$ and $S'_2(t_2)$ shaped under the same experimental conditions as the pulses of FIG. 3A, but with the shaping time modified. In the case of FIG. 3B, a delay line based on a second delay $\delta t_2$ equal to 200 ns was used. It may be seen that their respective amplitudes $A'_2(t_1)$ and $A'_2(t_2)$ are identical, this attesting to the stability of the conversion gain in this configuration based on a long shaping time $\delta t_2$.

Figure 3C:
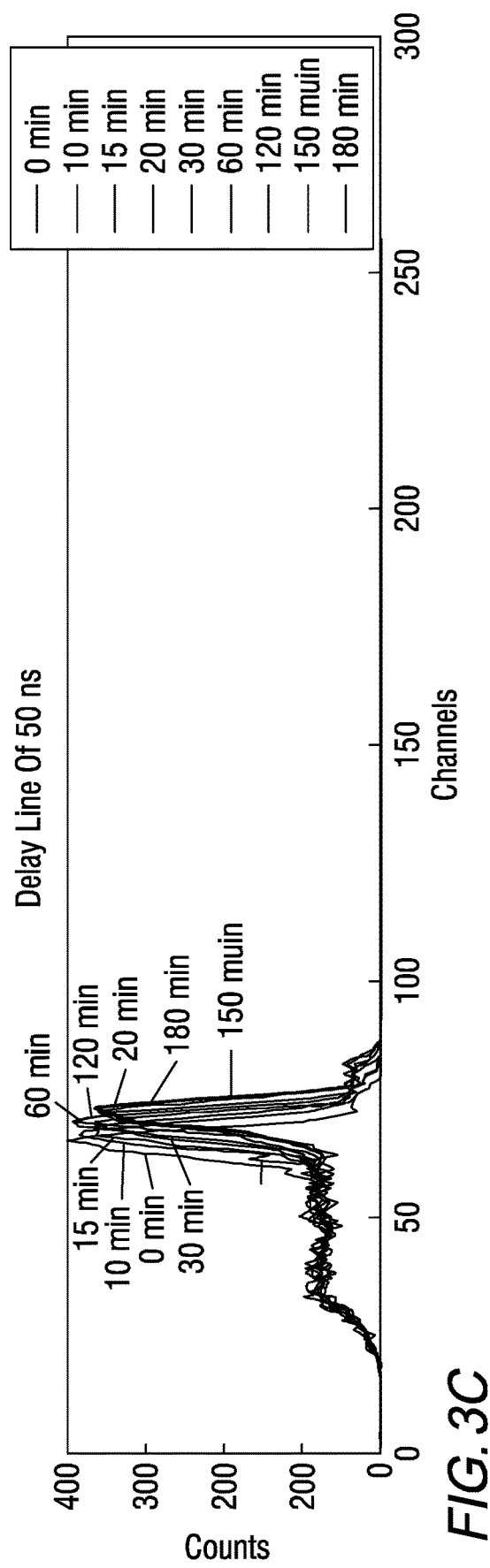
FIG. 3C shows the variation as a function of time of a spectrum of radiation produced by an isotopic $^{57}$Co source with a shaping circuit having a first shaping time.
Figure 3D:
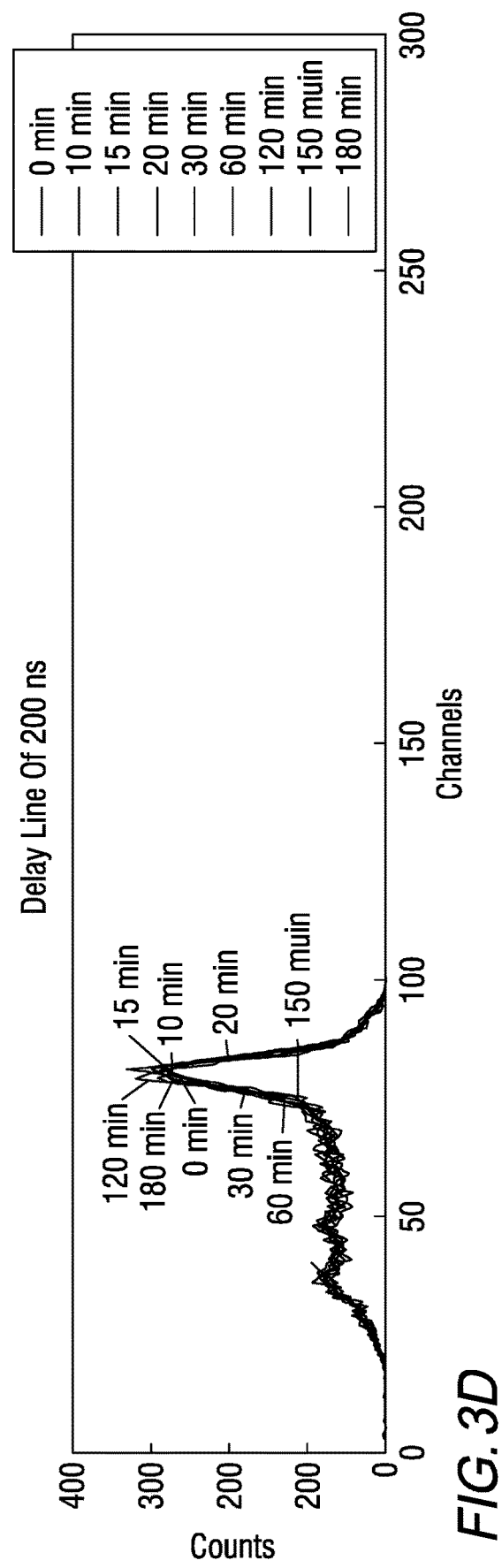
FIG. 3D shows the variation as a function of time of a spectrum of radiation produced by an isotopic $^{57}$Co source with a shaping circuit having a second shaping time longer than the first shaping time.

The effect of drift in the conversion gain as a function of the shaping time may be observed in FIGS. 3C and 3D, which show energy spectra of the radiation emitted by a $^{57}$Co source acquired at various times, using a short shaping time (50 ns) and a long shaping time (200 ns), respectively. In FIG. 3C, the drift in the conversion gain results in a gradual shift in the spectra to higher energies. In FIG. 3D, the various spectra superpose, the conversion gain being stable.

Figure 2C:
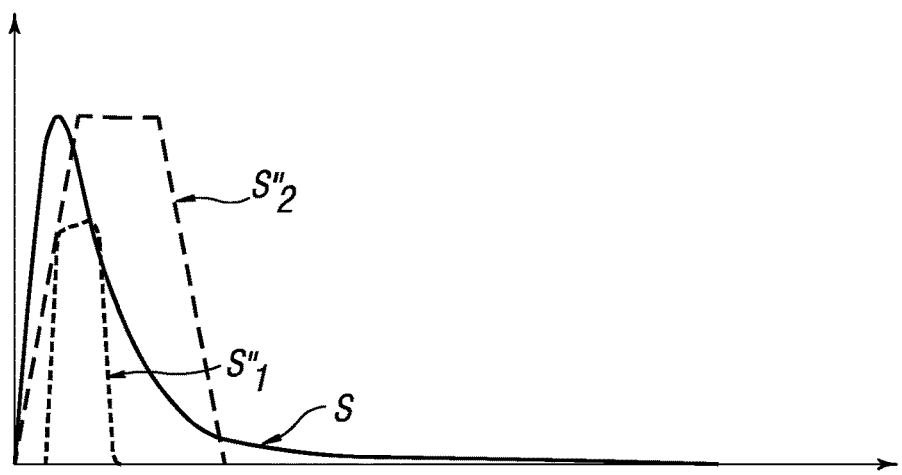

It will be noted that this effect does not depend on the type of shaping circuit implemented. The examples illustrated in FIGS. 3A to 3D were obtained with a delay-line type shaping circuit. The same effect may be observed with other types of shaping circuit, based on a variable shaping time. For example, the shaping circuit may be a filter allowing a pulse of parameterizable shape, for example a Gaussian, triangular or trapezoidal shape, to be generated, this type of circuit being conventional in the field of gamma or x-ray spectroscopy. The pulse response of such a circuit is a pulse of pre-set geometric shape that is parameterizable by the shaping time. The use of Gaussian filters, generating a pulse of Gaussian shape and the full-width at half maximum of which is parameterizable, is common in the field of x-ray or gamma spectroscopy. Use of such filters is described in the publication Salathe M. "Optimized digital filtering techniques for radiation detection with HPGe detectors". The filter may also be triangular, the base of the triangle being parameterizable, or trapezoidal, the width of the top of the pulse being parameterizable. FIG. 2C schematically shows, for example, a pulse S output from a preamplifier, and pulses $S''_1$ and $S''_2$ shaped with a trapezoidal filter using a first shaping time $\delta t_1$ and a second shaping time $\delta t_2$, respectively, with $\delta t_2 > \delta t_1$.

Thus, a short shaping time $\delta t_1$ limits pile-ups, but is accompanied by a temporal drift in conversion gain. A long shaping time $\delta t_2$ increases the probability of observing a pile-up, but benefits from a stable conversion gain. The inventors have taken advantage of this observation to provide a method the main steps of which are described below, with reference to FIGS. 4A and 4C.

Step 100: detection: the detector 10 is exposed to incident ionizing radiation 5, a particle of which interacts in the detector to form charge carriers collected by an electrode.

Step 110: preamplification: the collected charge Q is integrated by a preamplifier, so as to form a pulse S, called the measurement pulse, which is generally asymmetric, and which has a rise time $t_r$ and which decreases exponentially. The measurement pulse is formed at a measurement time t.

Figures 4A, 4B:
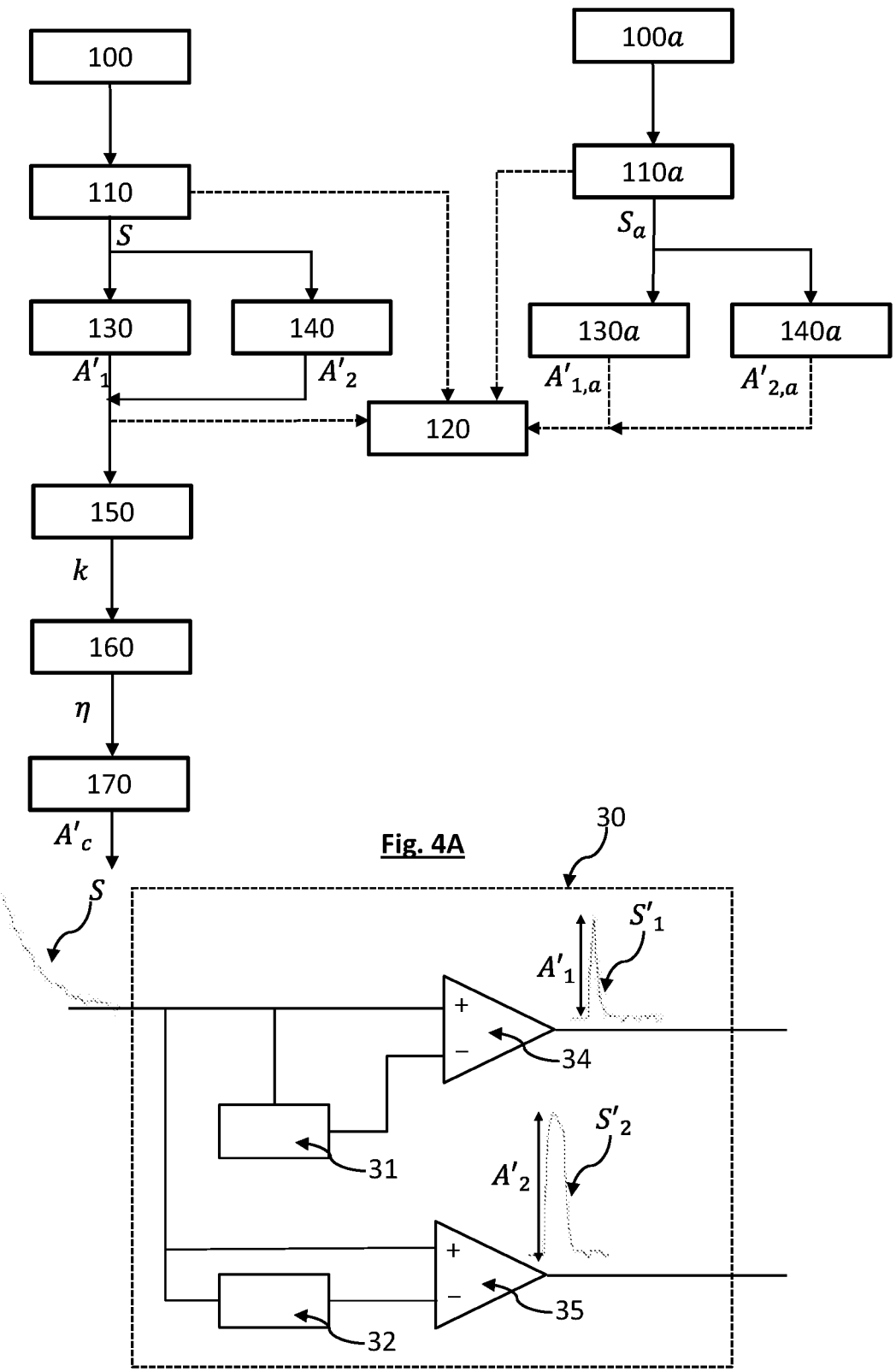
FIG. 4A shows the main steps of one embodiment of the invention.
FIG. 4B shows a circuit including two delay lines allowing two different operations of shaping a measurement pulse to be implemented, using a first shaping time and a second shaping time, respectively.

Step 130: first operation of shaping the measurement pulse S using a first shaping time $\delta t_1$. In this example, the shaping operation is carried out by a first delay-line circuit 31, as shown in FIG. 4B, the delay line generating a delayed pulse $S_{\delta t1}$, as explained with reference to FIG. 2A. The first delay line 31 is connected to the inverting input of a subtractor 34, the noninverting input of which receives the measurement pulse S. The first shaping time $\delta t_1$ is shorter than the rise time $t_r$ of the measurement pulse S output from the preamplifier 20. This step generates a first shaped pulse $S'_1$ of first amplitude $A'_1$.

Step 140: second operation of shaping the measurement pulse S using a second shaping time $\delta t_2$. In this example, the shaping operation is obtained with a second delay-line circuit 32, as shown in FIG. 4B, the delay line generating a delayed pulse $S_{\delta t2}$, as explained with reference to FIG. 2B. The second delay line 32 is connected to the inverting input of a subtractor 35, the noninverting input of which receives the measurement pulse S, output from the preamplifier 20. The second shaping time $\delta t_2$ may be longer than or equal to the rise time $t_r$ of the pulse S output from the preamplifier 20. This step generates a second shaped pulse $S'_2$ of second amplitude $A'_2$.

Figure 4C:
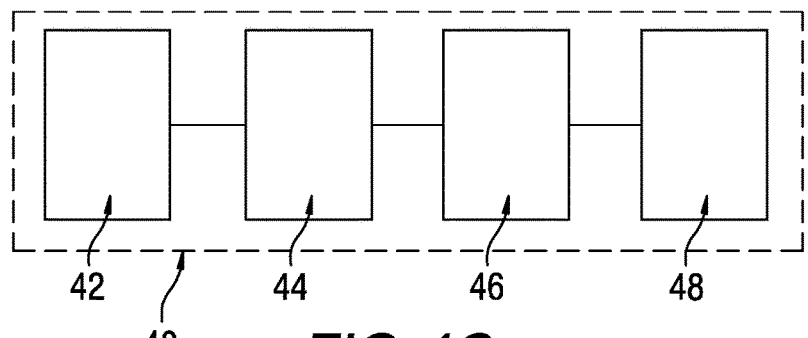
FIG. 4C shows a processing circuit allowing the method illustrated in FIG. 4A to be implemented.

Steps 150, 160 and 170, which are described below, are implemented by the correcting circuit 40 illustrated in FIG. 4C. The correcting circuit 40 includes a comparing unit 44, a computing unit 46 and a correcting unit 48. It may include a selecting unit 42 when the optional step 120 described below is implemented. Implementation of the selecting step 120 is however recommended.

Step 150: comparison of the first and second amplitudes. In this step, the comparing unit 44 makes a comparison of the amplitudes $A'_1$ and $A'_2$ of the respective pulses $S'_1$ and $S'_2$, so as to calculate a comparison factor k. In this example, the comparison factor k is a ratio between the amplitudes $A'_1$ and $A'_2$, for example $$k = \frac{A'_1}{A'_2}.$$

The objective of the following steps is to multiply the measured first amplitude $A'_1$ by a correction factor $$\frac{1}{\eta},$$

so as to compensate for the temporal drift in the conversion gain. The correction factor $\eta$ may be equal to the comparison factor k. However, the inventors have concluded that it is preferable to establish a correction factor from comparison factors k respectively calculated for a certain number of pulses, called pulses of interest.

Step 160: calculation of the correction factor. On the basis of the comparison factor calculated in step 150, the computing unit 46 determines a correction factor $\eta$. The correction factor $\eta$ is determined depending on comparison factors $k_1 \ldots k_N$ obtained by applying steps 110 to 150 to pulses $S_1 \ldots S_N$, called pulses of interest, formed prior and/or subsequent to the measurement pulse S, respectively. In other words, if t designates the measurement time, at which the measurement pulse S is formed, the pulses of interest are formed by the detector prior or subsequent to the measurement time t. The term pulse of interest designates a pulse generated by the detector, prior or subsequent to the measurement pulse S, and the comparison factor of which is retained. The correction factor $\eta$ may be calculated depending on the mean value or the median value of the comparison factors determined for various pulses of interest prior to the measurement pulse, and stored in a memory of the computing unit 46, to which factors the comparison factor k established for the measurement pulse S calculated in step 150 is added. In this example, $\eta = \text{mean}(k_1, \ldots, k_N, k)$. The pulses of interest $S_1 \ldots S_N$ are the N pulses generated during a time range $\Delta t$ called the period of interest, this time range lying after and/or before the measurement time t at which the measurement pulse S is formed. The number N is an integer designating the number of pulses of interest used to determine the correction factor. It may be comprised between 1 and 10000 or even more. The application of the correction factor $\eta$ to the amplitude of the pulse shaped using a short time interval $\delta t_1$ allows the temporal drift in the conversion gain of the detector to be corrected, as described with reference to FIGS. 3A and 3D. The higher N, the more stable the mean of the comparison factors and the less sensitive said mean is to detection noise. Too high a number N may decrease the precision with which the variation in the gain of the detector is tracked. The number N is determinable by those skilled in the art, by way of experimental trials allowing the variation in conversion gain to be characterized. In this embodiment, the period of interest $\Delta t$ lies before, about or after the measurement time t, the duration of the time range of interest possibly for example being 1 second or a few seconds. Generally, the duration of the period of interest $\Delta t$ is defined such that it is possible to consider that during this range, the conversion gain of the detector does not vary, or varies by a negligible amount.

According to one embodiment, after the detector 10 is turned on, for the first pulse, no comparison factor will have been measured. In this case, N=0. The first correction factor is determined solely depending on the comparison factor calculated for the measurement pulse. Subsequently, as each measurement pulse S is processed, the number N is incremented on each measurement pulse until reaching a preset maximum value $N_{max}$. The correction factor $\eta$ is then determined by calculating a moving mean (or median) of the $N_{max}$ comparison factors respectively determined for the $N_{max}$ pulses of interest that occurred prior to the measurement pulse.

According to one variant, after the detector is turned on, the number N of pulses of interest the comparison factor of which is taken into account in the calculation of the correction factor is set to a pre-set value. No correction factor is applied to the measurement pulses until N pulses of interest for which the comparison factor has been determined are available. From this moment, the correction factor is determined by taking a moving mean of the N comparison factors respectively determined for the N pulses of interest.

The pulses of interest may be distributed over a time range of interest lying before and after the measurement pulse S. It may for example be a question of $$\frac{N_{max}}{2}$$

pulses acquired before the measurement pulse and of $$\frac{N_{max}}{2}$$

pulses acquired after the measurement pulse. In this case, steps 160 and 170 are post-processing steps, i.e. they are implemented after the period of interest $\Delta t$. The correction is then delayed with respect to the measurement time t.

According to another variant, the correction factor $\eta$ is determined without taking into account the comparison factor of the measurement pulse, i.e. it is determined only on the basis of comparison factors respectively determined from pulses of interest.

Step 170: correction. The correction factor η is applied to the first shaped pulse S'$_1$, the amplitude A'$_1$ of which is multiplied by $$\frac{1}{\eta}.$$

A corrected amplitude $$A'_c = \frac{1}{\eta} A'_1$$

is then obtained. The correction is carried out by a correcting unit 48 of the processing circuit 40. The correcting unit uses the correction factor η calculated by the computing unit 46.

At the end of step 170, the steps 100 to 170 are reiterated on the detection of another measurement pulse S.

According to one variant, each comparison factor includes a normalized difference between the amplitudes A'$_2$ and A'$_1$. Thus, each comparison factor k is such that $$k = \frac{A'_2 - A'_1}{A'_1}.$$

A mean of the comparison factors is taken, so as to obtain a correction factor η, the corrected amplitude A'$_c$ being such that A'$_c$=A'$_1$+ηA'$_1$=A'$_1$(1+η).

Thus, the method described with reference to steps 100 to 170 allows an amplitude A'$_1$ of pulses S'$_1$ shaped using a short shaping time to be determined, this being compatible with use of the detector in a high-count-rate regime. The pulse thus shaped is corrected so as to attenuate, or even remove, the effect of drift in the conversion gain noted by the inventors. The advantage is to use a short shaping time, propitious to high count rates, while limiting the drawback related to the instability of the conversion gain as a function of time.

According to one preferred embodiment, the method includes a step 120 of selecting the pulses for which comparison factors k are determined: it is a question of the pulses of interest and optionally of the measurement pulse. The step 120 is implemented by the selecting unit 42. The objective is to avoid taking into account comparison factors derived from pulses formed following a pile-up of two interactions due to two different particles, or pulses resulting from charge carriers collected by two adjacent electrodes, when the detector is connected to a plurality of electrodes as shown in FIG. 1B. The selection allows only pulses formed by a single particle, and collected by a single electrode, to be retained. Although the selection may be carried out for each pulse of interest, it is described below with reference to a measurement pulse.

Figure 4D:
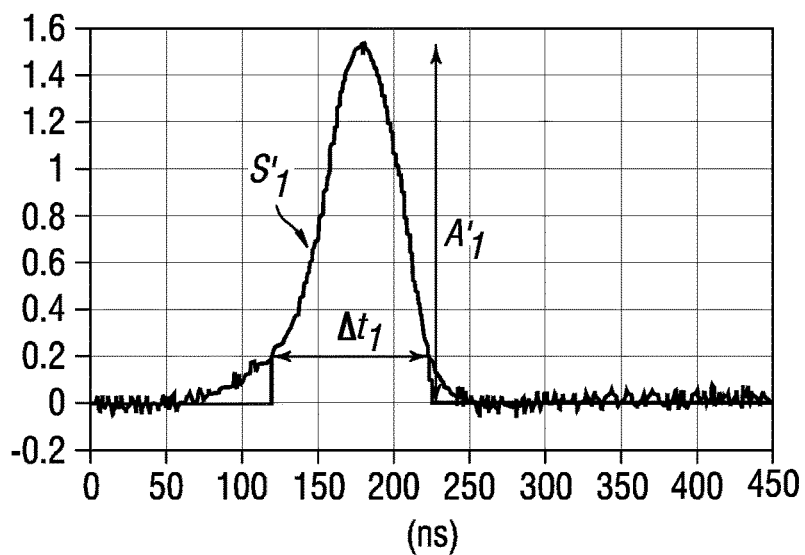
FIGS. 4D and 4E show the application of a selection criterion to a pulse shaped using a first shaping time and a second shaping time, respectively.
Figure 4E:
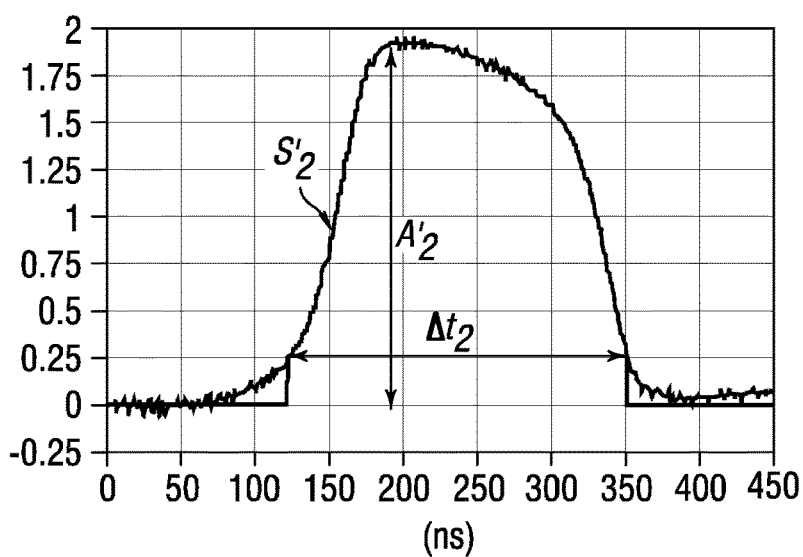

To detect the presence of a pile-up, the selecting unit 42 applies one or more selection criteria to the measurement pulse S generated by the preamplifier 20, or to the first or second shaped pulse. A selection criterion may be a duration of the first shaped pulse and/or of the second shaped pulse S'$_2$ above a predefined threshold. This selection criterion is illustrated in FIGS. 4D and 4E. In FIG. 4D, a pulse S'$_1$ shaped by the first shaping circuit using the short first time interval δt$_1$ of 50 ns is shown. The duration Δt$_1$ of the pulse above a threshold of amplitude equal to 0.2 is indicated by a double-headed arrow. When the duration Δt$_t$ exceeds a maximum duration, for example 80 ns, the pulse is considered to result from a pile-up and the pulse is rejected. In FIG. 4E, a pulse S'$_2$ shaped by the second shaping circuit using the second time interval δt$_2$ of 200 ns is shown. The duration δt$_2$ of the pulse above a threshold of amplitude equal to 0.2 is indicated by a double-headed arrow. When the duration Δt$_2$ exceeds a maximum duration, for example 230 ns, the pulse is considered to result from a pile-up and the pulse is rejected.

Another selection criterion may be based on the rise time t$_r$ of a measurement pulse S, or on the rise time (peaking time) t'$_{r,1}$ of a pulse S'$_1$ shaped by the first shaping circuit, or on the rise time (peaking time) t'$_{r,2}$ of a pulse S'$_2$ shaped by the second shaping circuit. When at least one of these rise times exceeds a certain value, the corresponding pulse is rejected.

When the detector is connected to a plurality of collecting electrodes, as shown in FIG. 1B, a selection criterion is coincident detection of a pulse on an adjacent electrode 11$_a$. During an interaction, the generated charge Q may be collected by an electrode 10 whereas a complementary charge is collected by an adjacent electrode 11$_a$, in a step 100$_a$. The charge is then shared, the charge collected by each electrode not being representative of the energy deposited in the detector during the interaction. The complementary charge Q$_a$ is integrated by a preamplifier 20$_a$ in a step 110$_a$, so as to form an adjacent pulse S$_a$. The adjacent pulse S$_a$ is shaped by the adjacent amplifier 30$_a$ so as to obtain an adjacent first shaped pulse S'$_{1,a}$ using the first shaping time δt$_1$ (step 130$_a$) and an adjacent second pulse S'$_{2,a}$ shaped using the second shaping time δt$_2$ (step 140$_a$). The selecting unit 42 detects the presence of the adjacent pulse S$_a$ and/or the adjacent first shaped pulse S'$_{1,a}$ and/or the adjacent second shaped pulse S'$_{2,a}$. When at least one of these pulses occurs at the same time as the measurement pulse S issued from the collecting electrode 10, or as the first shaped pulse S'$_1$ or the second shaped pulse S'$_2$, charge sharing is considered to have taken place and the measurement pulse S is rejected. To do this, the selecting unit compares the amplitudes A'$_{1,a}$ and A'$_{2,a}$ of the pulses S'$_{1,a}$ and S'$_{2,a}$ to a preset threshold. When an amplitude exceeds the threshold, a coincident detection has occurred. By coincidence what is meant is occurring at two times that are sufficiently close, for example in a time range, called the time range of coincidence T$_d$, of 10 or 20 ns about the detection time t$_d$ of a pulse of interest.

The selecting unit 42 may also base the selection on other selection criteria, for example:
- the presence of an inflection point in the measurement pulse S or in a shaped pulse S'$_1$ or S'$_2$, such a presence possibly indicating a pile-up.
- A ratio between the amplitude (A'$_1$ or A'$_2$) of a shaped pulse (S'$_1$ or S'$_2$) and the integral of said pulse, too high a ratio possibly indicating the presence of a pile-up.
- An amplitude of the measurement pulse S or of a shaped pulse (S'$_1$ or S'$_2$) lower than a preset threshold value, below which the pulse is considered to be insignificant and caused by noise.
- Too high a count rate, the count rate being the number of pulses detected per unit time.

Thus, the selecting unit 42 bases the selection on one or more selection criteria with a view to rejecting pulses that are not representative of the charge deposited by an interaction of one particle in the detector medium 10. These undesirable pulses are not taken into account in the calculation of the correction factor η. The selecting step 120 allows a correction factor that is independent of the count rate of the detector to be obtained. The pulses selected by the selecting unit 42 are processed by the comparing unit 44, the computing unit 46 and the correcting unit 48.

Figure 5A:
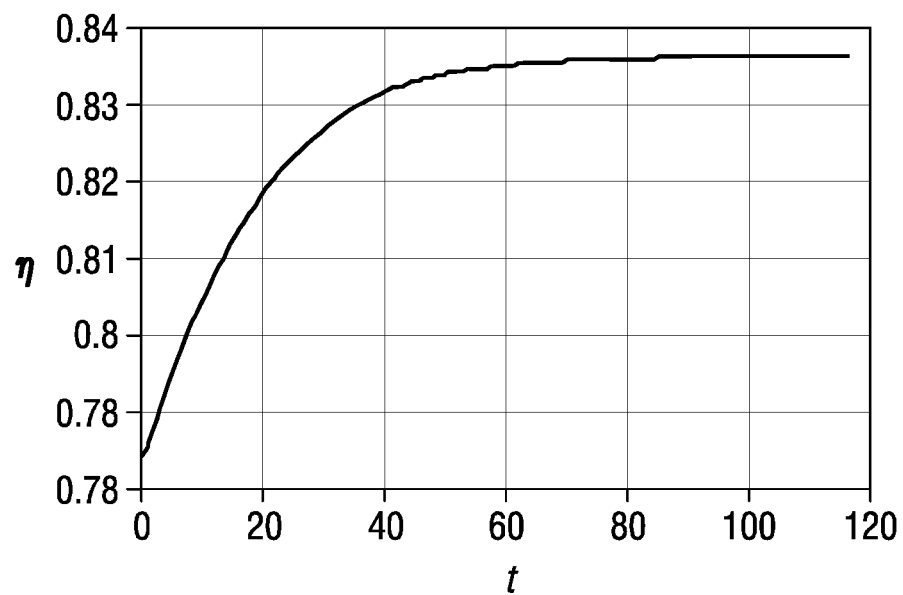
FIG. 5A shows a variation as a function of time of a correction factor.

The experimental device described above was subjected to a prolonged irradiation, the radiation source being an x-ray generator raised to a voltage of 120 kV. FIG. 5A shows the variation in the correction factor η as a function of time, from the turn-on of the detector (t=0) to 2 hours after this turn-on (t=120 minutes). The correction factor was calculated by taking a moving mean of 1024 comparison factors. It may be seen that the correction factor η varies between an initial value of about 0.785 and a final value in the vicinity of 0.835. This curve shows the pertinence of considering a correction factor that varies over time.

Figure 5B:
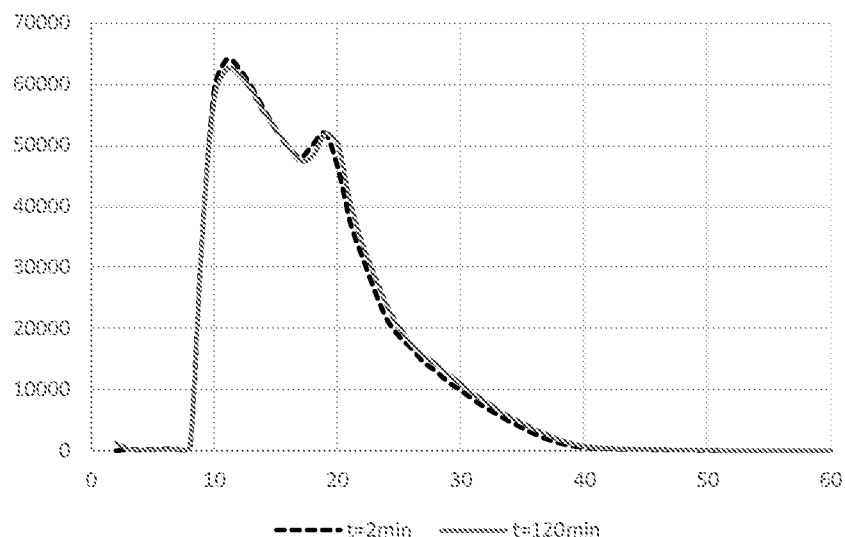
FIG. 5B illustrates two spectra of the radiation produced by an x-ray source, without implementation of the invention, the respective acquisitions of the two spectra being offset by 120 minutes.
Figure 5C:
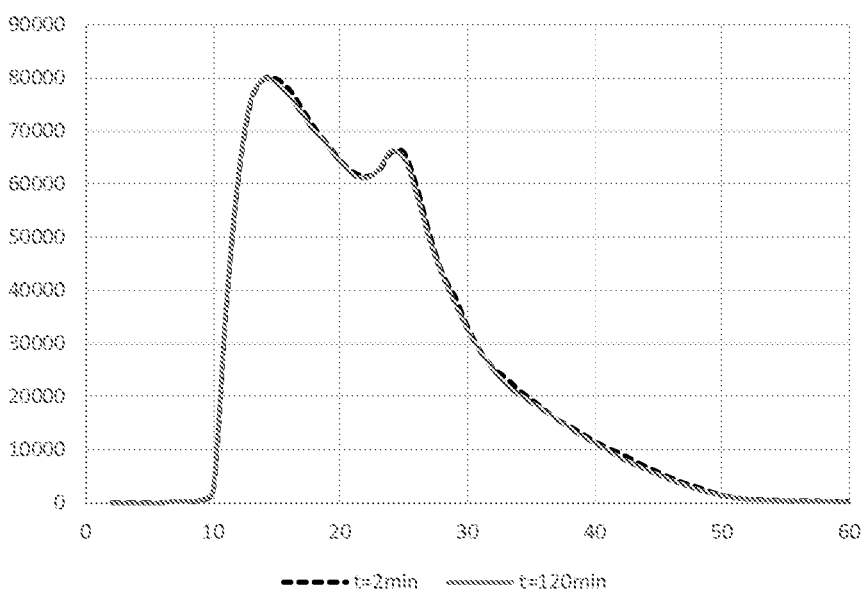
FIG. 5C illustrates the radiation spectra described with reference to FIG. 5B after implementation of the invention.

FIG. 5B shows spectra of the radiation 5 emitted by the x-ray generator and detected by the detector 10 at t=2 min and at t=120 min after turn-on of a detector 10, respectively, with pulses shaped with the first shaping circuit, using a shaping time of 50 ns, without correction of the pulses. A spectral drift towards higher energies is observed. FIG. 5C shows spectra of the radiation 5 detected by the detector 10 at t=2 min and at t=120 min, respectively, with implementation of steps 100 to 170, i.e. with each pulse shaped by the shaping circuit corrected by applying the correction factor shown in FIG. 5A. It may be seen that the two spectra are not shifted with respect to each other, but superpose, this attesting to the reliability of the correction.

Figure 6B:
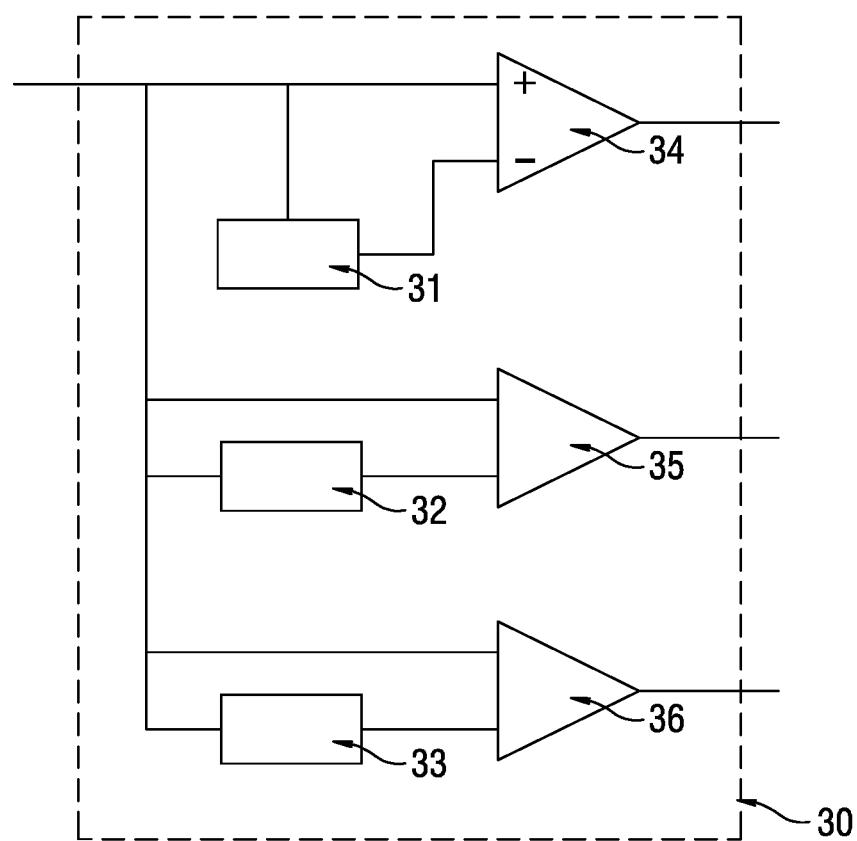
FIG. 6B shows a circuit including three delay lines allowing three different operations of shaping a measurement pulse to be implemented, using a first shaping time, a second shaping time and a third shaping time, respectively.
Figure 6A:
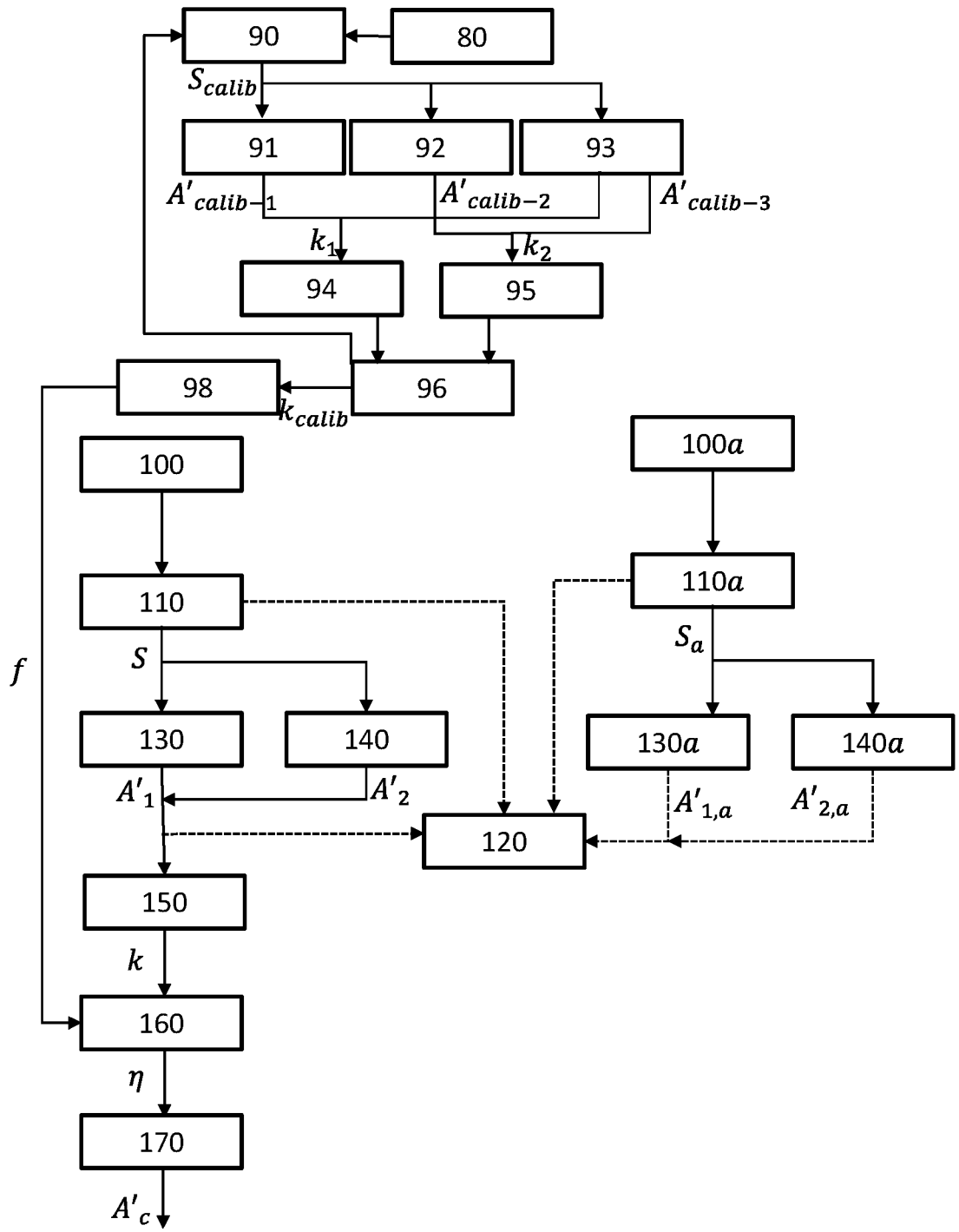
FIG. 6A shows the main steps of another embodiment of the invention.

FIG. 6A shows another embodiment of a method according to the invention. Steps 100, 110, 120, 130, 110$_a$, 130$_a$ and 140$_a$ are identical to those described with reference to FIG. 4A. In this embodiment the first shaping time δt$_1$ and the second shaping time δt$_2$ are shorter than the rise time t$_r$ of the measurement pulse S. For example, δt$_1$=50 ns and δt$_2$=30 ns. In step 150, the comparing circuit 44 determines a comparison factor k by comparing the amplitudes A'$_1$ and A'$_2$; for example $$k = \frac{A'_1}{A'_2}.$$

It will be noted that in this example, δt$_2$>δt$_1$.

In step 160, on the basis of the comparison factor k established for the measurement pulse, the correcting circuit 46 determines a correction factor η such that η=ƒ(k). The function ƒ is obtained in a prior calibrating phase, described with reference to steps 90 to 98.

In step 170, the correcting unit applies the correction factor η to the first shaped pulse S'$_1$, such that $$A'_c = \frac{1}{\eta} A'_1.$$

A first difference between this embodiment and the preceding embodiment, shown in FIG. 4A, is that the shaping circuits use shaping times that are shorter than the rise time t$_r$ of the measurement pulse S generated by the preamplifier 20. This allows pile-ups to be limited and this embodiment is therefore suitable for high count rates.

A second difference is that this embodiment assumes a prior calibrating phase, described with reference to steps 80 to 98. This calibrating phase corresponds to a period (or time range) of interest Δt, during which pulses of interest are acquired so as to calculate comparison factors. In the preceding embodiment, the pulses of interest are measurement pulses formed in a given measurement sequence, prior and/or subsequent to each measurement pulse, using the same irradiation source. In the present embodiment, the pulses of interest are formed in a prior calibrating phase. This calibrating phase is preferably implemented using a calibration source that does not expose the detector to excessively intense incident radiation, so that the count rate is low, thereby limiting the probability of detection of pile-ups. In the calibrating phase, the amplifier 30 includes three shaping circuits, as illustrated in FIG. 6B:

a first shaping circuit based on a first shaping time δt$_1$, and, preferably δt$_1$<t$_r$. In this example, δt$_1$=50 ns.

a second shaping circuit, based on a second shaping time δt$_2$ with δt$_2$≠δt$_1$ and, preferably, δt$_2$<t$_r$. In this example, δt$_2$=30 ns.

a third shaping circuit, based on a third shaping time δt$_3$ with δt$_3$>δt$_2$, δt$_3$>δt$_1$, preferably, δt$_3$≥t$_r$. In this example, δt$_3$=200 ns.

In the example shown in FIG. 6B, the first, second and third shaping circuits are delay-line circuits respectively including the first delay line 31 and the second delay line 32 described with reference to FIGS. 1C and 1D, and a third delay line 33 applying a time delay equal to δt$_3$ to the pulse S generated by the preamplifier 20, respectively. The third shaping circuit is connected to the inverting input of a subtractor 36, the noninverting input of which receives the pulse S output by the preamplifier 20.

The calibrating step is now described, with reference to steps 80 to 98.

Step 80: detection: the detector is exposed to incident ionizing radiation, a particle of which interacts in the detector to form charge carriers Q that are collected by an electrode.

Step 90: preamplification: the collected charge is integrated in a preamplifier, so as to form a calibration pulse S$_{calib}$.

Step 91: first operation of shaping the calibration pulse S$_{calib}$ generated by the preamplifier, using the first shaping time δt$_1$, so as to obtain a first shaping amplitude S'$_{calib-1}$ of first amplitude A'$_{calib-1}$.

Step 92: second operation of shaping the calibration pulse S$_{calib}$ generated by the preamplifier, using the second shaping time δt$_2$, so as to obtain a second shaping amplitude S'$_{calib-2}$ of second amplitude A'$_{calib-2}$.

Step 93: third operation of shaping the calibration pulse S$_{calib}$ generated by the preamplifier, using the third shaping time δt$_3$, so as to obtain a third shaping amplitude S'$_{calib-3}$ of third amplitude A'$_{calib-3}$.

Step 94: calculation of a first comparison factor k$_1$ via comparison of the first amplitude A'$_{calib-1}$ and the third amplitude A'$_{calib-3}$. For example, $$k_1 = \frac{A'_{calib-1}}{A'_{calib-3}}.$$

The first comparison factor k$_1$ is called the auxiliary comparison factor below.

Step 95: calculation of a second comparison factor k$_2$ via comparison of the second amplitude A'$_{calib-2}$ and the third amplitude A'$_{calib-3}$. For example $$k_2 = \frac{A'_{calib-2}}{A'_{calib-3}}.$$

Figure 6C:
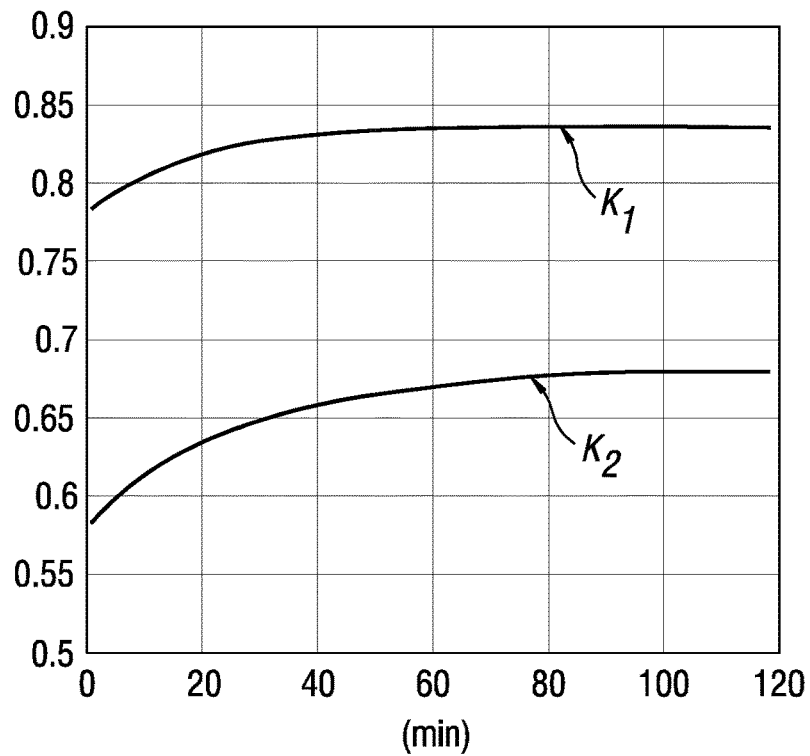
FIG. 6C shows the variation as a function of time of a first comparison factor and of a second comparison factor.

Step 96: reiteration of steps 90 to 95, so as to establish a succession of pairs $(k_1, k_2)$ as a function of time. FIG. 6C shows a variation as a function of time, over a length of time of 120 minutes, in the first comparison factor $k_1$ and in the second comparison factor $k_2$.

Step 98: generation of the correction function. It is a question of establishing a correction function $f$ allowing a relationship between the ratio $$\frac{k_1}{k_2}$$

and the first correction factor, called the auxiliary correction factor $k_1$, to be established. It will be noted that $$\frac{k_1}{k_2} = \frac{\frac{A'_{calib-1}}{A'_{calib-3}}}{\frac{A'_{calib-2}}{A'_{calib-3}}} = \frac{A'_{calib-1}}{A'_{calib-2}}.$$

The ratio $$\frac{k_1}{k_2}$$

corresponds to an amplitude shaped by the first shaping circuit over an amplitude shaped by the second shaping circuit. It therefore corresponds to the comparison factor k described above, except that it is established for calibration pulses. It is noted $k_{calib}$.

Figure 6D:
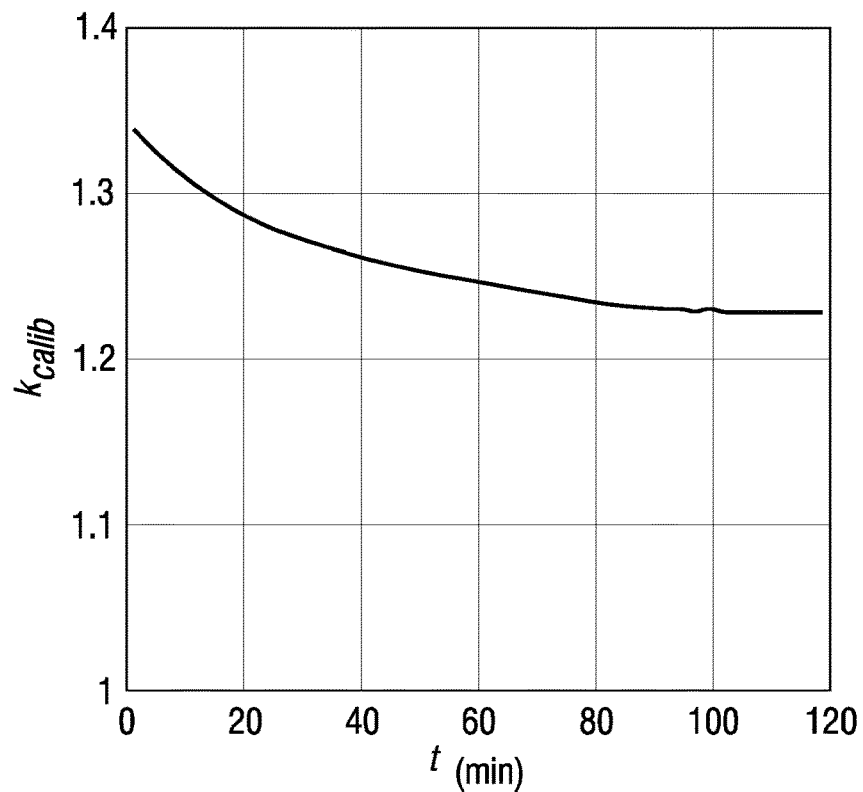
FIG. 6D shows a variation in what is called a calibration comparison factor as a function of the first comparison factor shown in FIG. 6C.

FIG. 6D, obtained from the data of FIG. 6C, shows a variation over time in the ratio $$k_{calib} = \frac{k_1}{k_2}.$$

Figure 6E:
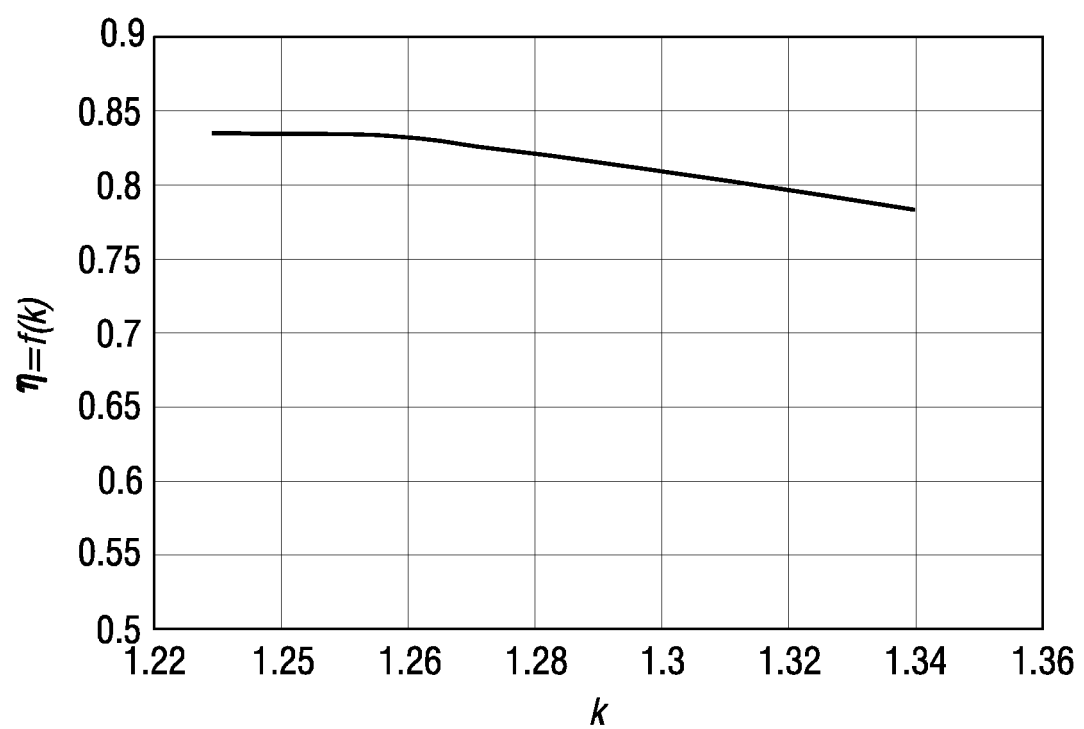
FIG. 6E illustrates a correction function, allowing a correction factor to be established depending on a comparison factor.

However, the first comparison factor $k_1$ corresponds to the correction factor η allowing each first amplitude $A'_1$ to be corrected so as to obtain a corrected amplitude $A_c$, in order to estimate an amplitude shaped with a long shaping time, i.e. longer than or equal to the rise time $t_r$. Moreover, the variation as a function of time in $k_1$ is known (see FIG. 6C). By crossing the data of FIGS. 6C and 6D, it is possible to obtain a correction function $f$ by determining the variation, over a plurality of calibration pulses, in a mean (or in a median) of auxiliary correction factors $k_1$ as a function of a mean (or a median) of calibration factors $k_{calib}$. The correction function $f$ is the variation in the correction factor η as a function of the comparison factor k. This function is shown in FIG. 6E. It results from the calibrating phase.

On the basis of the correction function $f$, knowing the comparison factor k of a measurement pulse, the correction factor η is obtained using the expression η=$f$(k). The correction is then carried out such that the corrected amplitude $A'_c$ is such that $$A'_c = \frac{1}{\eta} A'_1.$$

According to one variant, the comparison factor k calculated in step 150 is such that $$k = \frac{A'_2}{A'_1}.$$

In this case, for each calibration pulse, $$k_{calib} = \frac{A'_2}{A'_1}$$

is determined. During the calibration, the variation in the second comparison factor $k_2$ is determined as a function of the ratio $k_{calib}$, so as to obtain the correction function $f$. The second comparison factor then corresponds to the auxiliary correction factor. In step 160, the correction factor η=$f$($k_{calib}$) is determined and, in step 170, the correction is carried out by applying the correction factor η to the second corrected amplitude $A'_2$ such that $$A'_c = \frac{1}{\eta} A'_2.$$

Generally, the first comparison factor $k_1$ or the second comparison factor $k_2$ are designated by the term auxiliary comparison factor.

According to one embodiment, the method includes acquiring measurement pulses S, during an acquisition period $T_a$, the measurement pulses $S'_1$ processed by the first shaping circuit being classified depending on their respective amplitudes $A'_1$, so as to form a spectrum Sp. The spectrum Sp corresponds to a histogram of the amplitudes of the pulses treated by the first shaping circuit. Moreover, each measurement pulse S is also processed by the second shaping circuit, so as to obtain a comparison factor k for each measurement pulse. In this embodiment, the time range of interest Δt corresponds to the acquisition period $T_a$. A correction factor η is defined for the time range of interest Δt on the basis of the comparison factors. The correction is not applied successively, to each acquired amplitude, but simultaneously, to correct the spectrum Sp, so that:

$Sp_c(i')=Sp(\eta \times i) \times n$, where:

$Sp_c$ is the corrected spectrum;
i' is a channel of the corrected spectrum;
η is the correction factor, which is determined depending on the correction factors respectively calculated for the pulses composing the spectrum;
n is a normalization term, defined such that the integral of the corrected spectrum $Sp_c$ corresponds to the integral of the uncorrected spectrum Sp. For example, $$n = \frac{\Sigma Sp_c(i')}{\Sigma Sp(i)};$$

and
i is a channel of the spectrum Sp before the correction.
The correction amounts to shifting the spectrum Sp in the direction of lower channels, so as to correct the spectral drift resulting from the gradual increase in conversion gain.

This embodiment assumes that the conversion gain is stable during the acquisition period $T_a$ of the spectrum Sp. This embodiment allows the amplitudes $A'_1$ shaped by the first shaping circuit to be corrected simultaneously.

Moreover, as mentioned above, whatever the embodiment, the method may include a digitizing step, for example between the preamplifier and the amplifier, or between the amplifier and the correcting circuit, or downstream of the latter.

The invention will possibly be implemented in high-count-rate measuring applications, these applications possibly being to non-destructive testing, the inspection of luggage, the nuclear field or the field of diagnostics or of the monitoring of medical treatment.

The invention claimed is:

1. A method for processing a pulse generated by a detector of ionizing radiation, the detector being configured to interact with ionizing radiation and to form the pulse thereof, an amplitude of the pulse depending on an energy generated by the ionizing radiation during its interaction in the detector, the method comprising:
   a) exposing the detector to a source of ionizing radiation so as to obtain, at a measurement time, a measurement pulse;
   b) shaping the measurement pulse, using a first shaping time, and determining a first amplitude of the measurement pulse thus shaped; and
   c) correcting the first amplitude determined in b), by using a correction factor, so as to obtain a corrected amplitude;

wherein the correction factor is determined by taking into account pulses of interest, formed by the detector during an exposure to the source or to a calibration source, during a period of interest, prior and/or subsequent to the measurement time;

wherein determining the correction factor comprises, for each pulse of interest:
   i) shaping the pulse of interest, in a first shaping operation, using the first shaping time, and measuring a first amplitude of the pulse of interest thus shaped;
   ii) shaping the pulse of interest, in a second shaping operation, using a second shaping time that is different from the first shaping time, and measuring a second amplitude of the pulse of interest thus shaped; and
   iii) comparing the first amplitude and the second amplitude of the pulse of interest, so as to calculate a comparison factor;

the correction factor being determined depending on the comparison factors calculated, in step iii), for each pulse of interest.

2. The method of claim 1, also comprising:
shaping the measurement pulse, using the second shaping time, and determining a second amplitude of the measurement pulse thus shaped; and
comparing the first amplitude and the second amplitude of the measurement pulse, so as to calculate, for the measurement pulse, a comparison factor;
such that the correction factor is also determined depending on the comparison factor calculated for the measurement pulse.

3. The method of claim 1, wherein, in iii), the correction factor is determined depending on a mean value or a median value of the comparison factors respectively calculated for each pulse of interest.

4. The method of claim 1, wherein the period of interest lies before and/or after the measurement time.

5. The method of claim 1, wherein the period of interest is a calibration phase, in which the detector is exposed to the calibration source, the method being such that, determining the correction factor also comprises, for each pulse of interest:
   iv) shaping the pulse of interest, in a third shaping operation, using a third shaping time, the third shaping time being longer than the second shaping time and than the first shaping time, and determining a third amplitude of the pulse of interest thus shaped; and
   v) comparing the third amplitude with the first amplitude of the pulse of interest resulting from i) or with the second amplitude of the pulse of interest, resulting from ii), so as to calculate an auxiliary comparison factor;

the determination of the correction factor also comprising establishing a correction function representing a variation of the comparison factor determined for the pulses of interest as a function of the auxiliary comparison factor determined for said pulses of interest, the method also comprising:
shaping the measurement pulse, using the second shaping time, and determining a second amplitude of the measurement pulse; and
comparing the first amplitude and the second amplitude of the measurement pulse, so as to calculate, for the measurement pulse, a comparison factor;
such that, in step c), the correction factor is determined depending on a value of the correction function corresponding to the comparison factor calculated for the measurement pulse.

6. The method of claim 1, wherein:
   a) and b) are implemented for a plurality of measurement pulses, during an acquisition period, the method comprising a step b') of forming a spectrum, representing a histogram of the first amplitudes shaped in each step b);
   i) to iii) are carried out for each pulse acquired during part of all of the acquisition period, such that the period of interest corresponds to part of all of the acquisition period; and
   in c), the method comprises a realignment of the spectrum formed in step b'), taking into account the correction factor calculated in step iii), so as to form a corrected spectrum.

7. The method of claim 1, wherein determining the correction factor comprises a selecting step of selecting pulses of interest, the selecting step comprising, for each pulse of interest:
determining a criterion of the pulse of interest or of the pulse resulting from the first or from the second shaping operation of shaping the pulse of interest;
comparing the criterion with a threshold value; and
selecting the pulse of interest depending on the comparison;
such that steps i) to iii) are implemented only for the pulses of interest thus selected.

8. The method of claim 7, wherein the selecting step comprises:
determining a duration of the pulse of interest resulting from the first or from the second shaping operation;
taking into account a threshold duration;
comparing the determined duration with the threshold duration; and
selecting the pulse of interest depending on the comparison.

9. The method of claim 7, wherein the selecting step comprises:

determining an area and an amplitude of the pulse resulting from the first or from the second shaping operation of shaping the pulse of interest;
taking into account a threshold ratio value;
calculating a ratio between the area and amplitude thus determined;
comparing the ratio with the threshold ratio value; and
selecting the pulse of interest depending on the comparison.

10. The method of claim 7, wherein the selecting step comprises determining a second time derivative of the pulse of interest or of the pulse resulting from the first or from the second shaping operation of shaping the pulse of interest, the pulse of interest being selected if the second time derivative does not tend to zero or does not change sign.

11. The method of claim 7, wherein the selecting step comprises:
determining a rise time of the pulse of interest or of the pulse resulting from the first or from the second shaping operation of shaping the pulse of interest;
taking into account a threshold value of the rise time;
comparing the determined rise time with the threshold value of the rise time; and
selecting the pulse of interest depending on the comparison.

12. The method of claim 1, wherein the detector comprises:
a collecting electrode, configured to form the measurement pulse and the pulses of interest; and
an electrode adjacent to the collecting electrode, the adjacent electrode being able to form an adjacent pulse, an amplitude of which depends on an energy liberated by the ionizing radiation during its interaction in the detector;
and wherein determining the correction factor comprises a selecting step of selecting pulses of interest, the selecting step comprising, for each pulse of interest:
assigning a detection time to the pulse of interest;
analysing pulses formed by the adjacent electrode in a time range of coincidence lying about the detection time;
taking into account an amplitude threshold; and
rejecting the pulse of interest when a pulse, resulting from the adjacent electrode, in the time range of coincidence, exceeds the amplitude threshold.

13. The method of claim 1, wherein:
in step b), the measurement pulse is shaped by applying a first time delay to the measurement pulse, to form a delayed measurement pulse, and by subtracting the delayed measurement pulse from the measurement pulse, the first time delay corresponding to the first shaping time;
in step i), the first shaping operation of shaping the pulse of interest is carried out by applying the first time delay to the pulse of interest, in order to form a first delayed pulse of interest, and by subtracting the first delayed pulse of interest from the pulse of interest; and
in step ii), the second shaping operation of shaping the pulse of interest is carried out by applying a second time delay to the pulse of interest, to form a second delayed pulse of interest, and by subtracting the second delayed pulse of interest from the pulse of interest, the second time delay corresponding to the second shaping time.

14. The method of claim 2, wherein:
in step b), the measurement pulse is shaped by applying a first filter to the measurement pulse, the first filter taking into account the first shaping time;
in step i), the first shaping operation of shaping the pulse of interest is carried out by applying the first filter to the measurement pulse; and
in step ii), the second shaping operation of shaping the pulse of interest is carried out by applying a second filter to the pulse of interest, the second filter taking into account the second shaping time.

15. An electronic circuit for processing a pulse formed by a detector of an ionizing radiation, the detector comprising
a detector material, configured to interact with the ionizing radiation, so as to form electrical charge carriers during an interaction of the ionizing radiation in the detector; and
a preamplifier, configured to collect the charge carriers generated by the detector and to form a pulse, called a measurement pulse, an amplitude of which depends on an amount of charge collected;
the electronic circuit further comprising:
a first shaping circuit, configured to shape the measurement pulse using a first shaping time, so as to generate a first shaped pulse;
a second shaping circuit, configured to shape the measurement pulse using a second shaping time, longer than the first shaping time, so as to generate a second shaped pulse;
a comparing unit, configured to compare the first shaped pulse and the second shaped pulse, so as to determine a comparison factor;
a computing unit, configured to determine a correction factor depending on the comparison factor; and
a correcting unit, configured to apply the correction factor determined by the computing unit to the first shaped pulse, so as to form a corrected pulse;
wherein the computing unit is configured to implement steps i) to iii) of the method of claim 1, on the basis of pulses of interest formed by the detector during a period of interest.

16. The electronic circuit of claim 15, wherein:
the first shaping circuit comprises a first delay line, which delay line is configured to apply a first delay, corresponding to the first shaping time, to the measurement pulse, the first shaping circuit comprising a subtractor that is configured to subtract the pulse thus delayed from the measurement pulse; and
the second shaping circuit comprises a second delay line, which delay line is configured to apply a second delay, corresponding to the second shaping time, to the measurement pulse, the second shaping circuit comprising a subtractor that is configured to subtract the pulse thus delayed from the measurement pulse.

17. The electronic circuit of claim 16, wherein:
the first shaping circuit comprises a filter able to generate, from the measurement pulse, a first pulse of pre-set shape parameterized by the first shaping time; and
the second shaping circuit comprises a filter able to generate, from the measurement pulse, a second pulse of pre-set shape parameterized by the second shaping time.

\* \* \* \* \*